United States Patent Office 2,735,751
Patented Feb. 21, 1956

2,735,751

PROCESS OF DECOMPOSING BARIUM SULFATE AND OBTAINING PRODUCTS OF VALUE THEREFROM

Fredrik W. de Jahn, New York, N. Y., assignor of fifty-five per cent to Alan N. Mann, Scarsdale, N. Y.

No Drawing. Application July 19, 1954,
Serial No. 444,399

5 Claims. (Cl. 23—186)

This invention relates to a process of obtaining products of value (and particularly barium hydroxide) from barium sulfate, particularly barium sulfate ore (barytes). Essentially my process is this:

The barium ore in a finely ground state is mixed with finely ground iron sulfide (pyrites, $FeS_2$ or pyrrhotite, FeS) and formed into compacted aggregates or pellets. These aggregates are heated in a current of steam at a temperature in excess of 750° C. Under these conditions I have found it possible to drive off substantially all the sulfur either as elemental sulfur or in the form of gases from which elemental sulfur can be produced, at temperatures below the fusion point of the solid material. As a result, the aggregates retain substantially their original shape throughout this stage of the process while losing weight and becoming increasingly porous.

This phase of the process produces a product from which a limited amount of barium hydroxide can be leached out, but much of the residue is water-insoluble. To complete the process, the aggregates preferably still in their original form are treated in a current of hydrogen at a temperature in the order of about 625° C. or higher. This eliminates oxygen, and it will now be found that the major proportion of the barium can be leached out with hot water as barium hydroxide (or in some cases as will later be pointed out, a mixture of barium sulfide and barium hydroxide will be obtained). It is an interesting fact that much of the solid residue will still show approximately the shape of the original aggregates which are now approximately skeletons consisting principally of iron, together with any unconverted barium sulfate, other insoluble barium compounds and impurities.

The ability to carry out the necessary reactions at temperatures below the fusion point of the solids is an essential part of my process, for this permits me to maintain the material in the form of pellets which readily can be handled and through which the steam and the hydrogen can be passed. On the other hand, if higher temperatures were required and the material fused, the problems of handling would become commercially, virtually insurmountable.

It is also an important part of my process that the sulfur is recovered in elemental state, as this greatly affects the economics of the operation. It may be noted that an attempt was made many years ago to react barium sulfate and iron sulfide but it was reported that the mass fused and became unworkable before any reaction took place. (See Zeitschrift Anorganische und Allgemeine Chemie 1922–1924, page 342). By discovering the conditions under which the reaction takes place without fusion, I have made the process operative and practicable. This involves the two-stage process of treating the mixed aggregates of barium sulfate and iron sulfide with steam to drive off sulfur and render them porous, and then passing through the hydrogen to render the barium water-soluble.

In carrying out my invention, barium sulfate (barytes) and the iron sulfide (pyrites) are finely ground and thoroughly mixed together. The powder is then moistened (e. g. with 10% water) and formed into pellets which are dried at a temperature slightly above 100° C. The finely-ground pyrites and water appear to have a cementing action, for the dried pellets are amply strong to be used in carrying out the process, and if the process is correctly operated they will retain their shape throughout the decomposition and reduction step.

These pellets are to be heated in a current of steam at a temperature ranging from between 750° C. and about 1100° C. However, I have found that if the pellets are heated up in the presence of steam, say from the temperature at which they are dried to the reaction temperature, there is danger that the steam may act to decompose the pyrites before the reaction between the iron sulfide and barium sulfate takes place. This is particularly important if the percentage of pyrites used is low. In view of this, it is advantageous to preheat the pellets to a temperature of from 600° to 800° C. in an approximately inert atmosphere before subjecting the mass to the action of steam.

In any event the pellets are heated in a current of steam to a temperature which certainly should exceed 750° C. and ordinarily will range from 900° C. up to just short of the fusion point. Just what this fusion point is, is difficult to determine as during the course of the decomposition various eutectics are formed and there seems to be an indication that the material is more readily fusible at an intermediate point in the reaction than at the point where the reaction is substantially completed. The proportions of iron sulfide and barium sulfate in the original mix also appears to be a factor. Satisfactory results can ordinarily be obtained if the reaction temperature is allowed to run up to about 1000° C. or a little higher, but for the final completion of the reaction it can in some instances be permitted to go to about 1050° C. or even higher without fusion resulting. Thus in a batch operation the principal part of the reaction may be caused to occur at temperatures in the order of about 1000° C. or slightly higher and then after substantially all of the sulfur is driven off, the temperature may be increased somewhat, say to almost 1100° C., without causing serious change in the shape of the pellets. In the same way in the case of a continuous process where the material is heated by a countercurrent of superheated steam, the temperature of the steam may be somewhat above 1100°, as it will give up heat to the reaction and therefore during the main part of the reaction its temperature will be somewhat lower than the temperature at which it is introduced.

The presence of steam is an important factor in the first decomposition of the reaction mass and this steam not only must be present but it should sweep through the mass with sufficient velocity so that the equilibrium of the evolved gases is continuously being upset to accelerate the reaction. The steam also serves to carry off the evolved sulfur and sulfur compounds.

The proportions of the barium sulfate and iron sulfide necessary to cause some reaction to take place between them are not critical. However, if the amount of iron sulfide is too low, there may be difficulty in forming pellets of adequate strength and there may be an unduly large amount of unreacted barium sulfate in the residue from the first step of the process. In the subsequent treatment with hydrogen this apparently is reduced at least in part to barium sulfide. On the other extreme, largely increasing the amount of iron sulfide means an increase in the amount of material that must be handled for a given yield of barium hydroxide and there is some indication that increasing the percentage of barium sulfate may lower the fusion point and make the operation more difficult. In general one should use between 1 and 5 mols of iron sulfide for each mol of barium sulfate to get a reaction.

While the proportion of barium sulfate and iron sulfide necessary to get a reaction is not critical, the examples given below indicate that there is quite a narrow range where high yields of barium hydroxide are desired (which is usually the case). To obtain this result, apparently the proportions should be in the neighborhood of about 2½ to 3 mols (say from above 2 mols to about 3½ mols) of iron sulfide for each mol of barium sulfate. Apparently there is no great difference between using FeS and $FeS_2$ as the latter probably decomposes before the reaction is substantially under way.

As regards the amount of steam to be employed, the steam, as previously indicated, not only takes part in the reaction but also serves to carry off products of the reaction. For this reason a substantial excess of steam must be employed and this should be kept moving through the mass. Specifically I have found in general there should be at least 3 pounds of steam employed for each pound of sulfur in the mix and preferably the amount of steam should be even greater, ranging up to as much as ten times the weight of the sulfur or more as desired. The velocity of the steam through the mass should be at least 2 feet per second and preferably considerably higher. For example, it may range from 10 to 25 feet per second or higher if commercial conditions permit.

When the pellets are heated in the current of steam, some evolution of sulfur will be noticed at about 750° C. (which may be labile sulfur from $FeS_2$) and the evolution will be active at 900° C. The sulfur can be recovered from the steam in part as elemental sulfur and in part will be found in the form of a mixture of $H_2S$ and $SO_2$ which can be caused to react by known methods to yield elemental sulfur. As previously stated, this production of sulfur as an incident to the reaction is a matter of economic importance in my process.

The treatment with steam should continue until the evolution of sulfur substantially stops. This can readily be determined in a batch operation, whereas on a continuous operation this is dependent upon adjusting the rate of travel of the pellets through the furnace to the temperature employed and the rate of flow of the steam.

Based on my experience to date, I have found that it is possible to drive out all but a very few per cent of the sulfur originally in the pellets, or even substantially all of it.

If the furnacing operation has been properly carried out, the pellets will be in substantially their original form, but of course their weight will be reduced from the loss of sulfur and they will be quite porous. If these pellets are leached with hot water, a part of the barium will be dissolved out as barium hydroxide but a very substantial portion will remain undissolved— far more than can be accounted for by the amount of combined sulfur remaining. These pellets are, according to my invention, treated with a current of hydrogen. This treatment is carried out at a temperature in excess of 550° C. and preferably in the order of around 625° C. (say between 575° C. and 675° C.). There appears to be a point of maximum efficiency at a temperature of about 625° and if higher temperatures are used the efficiency falls off until temperatures in the order of 800° C. or higher are reached and then again one is getting up toward the danger line of fusion or sintering sufficient to reduce the porosity of the pellets. However, if desired, this higher temperature just short of the sintering point may be used. The hydrogen treatment is preferably continued until the evolution of water vapor substantially stops, and in some cases it is even desirable to repeat the hydrogen treatment after the pellets have been leached with water to obtain a second contact.

Usually the hydrogen treatment will be applied to the pellets in approximately their original shape, as I have found that attempting to crush the pellets appears to reduce their porosity.

Certain detailed methods of carrying out the operation on a batch basis are described in the following examples:

*Example No. 1.*—Finely ground barium sulfate ore (barytes) and finely ground iron sulfide ore (pyrites— $FeS_2$) were mixed together in the proportion of 2½ mols (300 parts by weight) of pyrites with one mol (233 parts by weight) of the barytes. This mixture was formed into pellets about the size of small marbles using approximately 10% of water, after which the pellets were dried at a temperature of approximately 110° C.

These pellets were heated in an externally heated stainless steel tube (26–28% chromium, 1% nickel) up to a temperature of 785° C. while passing nitrogen through the furnace. Provision was made so that the nitrogen (and later the steam) reached the furnace temperature before contacting the charge.

After this temperature was reached, the flow of nitrogen was reduced and steam passed through the furnace at a velocity substantially in excess of 5 feet per second. The temperature was raised to about 1020° C. over the course of about 2 hours and then was held at this temperature for about 3½ hours. The temperature was then raised to about 1050° C. over the course of approximately ½ hour. The flow of steam was continued throughout this heating period.

During this period, the reaction was marked by the evolution of sulfur. The major portion of this sulfur was condensed out with the steam as elemental sulfur and a minor proportion was recovered in the form of a mixture of $SO_2$ gas and $H_2S$ gas which were in the proportion of approximately 2 volumes of the $H_2S$ gas for one of the $SO_2$. These gases can readily be reacted to produce sulfur.

At the end of the 6-hour period, the evolution of sulfur had stopped and gases showed a faint trace of $SO_2$ but no $H_2S$. The mass was then allowed to cool in an atmosphere of nitrogen. A sample taken at this time when leached with hot water gave up a very small proportion of barium hydroxide. The mass was then heated to a temperature of about 615° C. for about 4 hours in a current of hydrogen. During this treatment water vapor was evolved. The product of this hydrogen reduction was leached out with water that was near to the boiling point, and the solute was found to contain about 77% of the theoretical barium as barium hydroxide with only traces of barium sulfide. On analysis the solid residue was found to contain slightly more than 5% of the original barium sulfate in undecomposed form. The nature of that part of this solid residue which had been decomposed but which was not water-soluble was not fully determined. However, it was found to be soluble in dilute hydrochloric acid. Apparently it consisted of complex bodies comprising barium, oxygen and iron and possibly hydroxyl groups. There was some indication that it was subject to further reduction by additional treatment with hydrogen.

*Example No. 2.*—In this case 305 parts by weight of pyrites was mixed with 295 parts of barytes equivalent to an approximate mol ratio of 2:1. The treatment was carried out as in Example No. 1.

In this case after the hydrogen treatment about 65% of the barium was found to be water-soluble but of this amount only about 50% of the whole was present as the hydroxide and the remaining 15% was barium sulfide. About 23% of the original barium remained as unconverted barium sulfate and about 12% was present as a water-insoluble compound apparently similar to the insoluble compound of Example No. 1.

*Example No. 3.*—400 parts of pyrites was mixed with 246 parts of barytes equivalent to an approximate mol ratio of 3:1. The treatment was carried out as in Example No. 1 but it was noted that after the steam treatment the pellets were slightly deformed, indicating that the material had approached the sintering temperature. This may have affected the porosity of the pellets slightly as a longer hydrogen treatment was required. After the hydrogen treatment was completed about 83% of the barium was found to be water-soluble and this was all barium hydroxide. If any barium sulfide was present it was only traces that could not be measured. About 3% of the barium sulfate remained unconverted. In order to have a further check on the nature of the insoluble residue the pellets from which the barium hydroxide had been leached out were dried and again subjected to the action of a current of hydrogen, after which they were leached with hot water, as before. In this case an additional 7% of the barium was obtained as the hydroxide so that in this example the yield of the original barium which was obtained as the hydroxide amounted to about 90%.

When this reaction is carried out on a large scale it is preferably done continuously. In such case after the pellets are formed, they are dried, and heated up to a temperature of about 700° C. in an inert atmosphere which can be prepared by eliminating $CO_2$ and free oxygen from combustion gases.

The preheated pellets are then introduced into a shaft furnace which should be externally heated but ordinarily it will be found desirable to supply part of the heat necessary by introducing superheated steam at the bottom of the shaft with an appreciable velocity as brought out above. As previously stated, the amount of steam should be sufficient to supply at least 3 pounds of steam for each pound of sulfur present and preferably the amount of steam will substantially exceed this figure. The time of passage of the pellets through the shaft furnace is adjusted so that when they are withdrawn at the bottom of the furnace, substantially all of the sulfur has been driven out of them.

When the pellets, which still retain substantial physical strength, are withdrawn from the shaft furnace, they are cooled in an atmosphere of combustion gases free from free oxygen and $CO_2$ down to a temperature of about 625° C. This temperature is maintained in any desired way (ordinarily by external heating) and hydrogen is passed through the mass sufficient substantially to reduce the iron oxide present. The pellets are then cooled somewhat and dropped into hot water which should be between about 80° C. and 90° C., or brought up to about that temperature by the heat of the pellets. It will now be found that barium hydroxide dissolves rapidly from the pellets which usually still hold their shape as skeletons of substantially reduced metallic iron. The solid residue can be allowed to settle out and the solution of barium hydroxide can be cooled to precipitate out a large proportion of the barium hydroxide and then may be reused for treating additional quantities of the pellets that have been reduced with hydrogen.

While this description indicates methods that may be employed for carrying out my invention, it is understood that it is not limited to any particular form of apparatus.

What I claim is:

1. The process of producing products of value from barium sulfate ore which comprises mixing such ore in finely ground state with finely ground iron sulfide in the proportions of from 1 to 5 mols of iron sulfide for each mol of barium sulfate, forming the mixture into aggregates, causing such mixture to react in a flowing current of steam at a temperature in excess of 750° C. but below the temperature of fusion whereby the sulfur is largely driven out and the aggregated material is rendered porous, passing hydrogen through such material at a temperature of at least about 550° C. but below the temperature of fusion to drive out oxygen and leaching out soluble barium hydroxide from the residue with hot water.

2. A process as specified in claim 1 in which the mixture of barium sulfate and iron sulfide is aggregated into pellets which are preheated to a temperature of at least about 600° C. before being caused to react with steam and then are passed continuously through a furnace against a countercurrent of superheated steam whereby the sulfur is carried off without substantially destroying the pellets.

3. In the process of decomposing barium sulfate to obtain products of value, the steps of mixing together crushed barium sulfate and crushed iron sulfide in the proportion of between 1 and 5 mols of iron sulfide for each mol of barium sulfate, forming the mixture into aggregates with water, drying such pellets and heating them to a temperature of from about 600° C. to 800° C. in an inert atmosphere, and subjecting such pellets to the action of a flowing current of steam at a temperature in excess of 750° C. and below the temperature which will cause the aggregates to fuse, whereby the major proportion of the sulfur is driven out and the aggregates are produced in a porous state.

4. The process of obtaining barium hydroxide from barium sulfate which comprises mixing barium sulfate in finely ground state with finely ground iron sulfide in the proportions of from about 2½ mols to about 3 mols of iron sulfide for each mol of barium sulfate, forming the mixture into pellets with water, heating such pellets in a current of steam at a temperature of at least 900° C. but below the temperature which will cause the pellets to fuse, whereby sulfur is driven out of the pellets, reducing the residue of the pellets in a current of hydrogen at a temperature of at least about 550° C. and leaching barium hydroxide from the residue with hot water.

5. A process as specified in claim 4 in which the hydrogen treatment is conducted at a temperature of about 625° C.

References Cited in the file of this patent

UNITED STATES PATENTS

| | | |
|---|---|---|
| 2,132,031 | Hybinette | Oct. 4, 1938 |

FOREIGN PATENTS

| | | |
|---|---|---|
| 111,667 | Germany | May 15, 1900 |
| 634,897 | Germany | Sept. 7, 1936 |